United States Patent

[11] 3,615,551

[72] Inventor Albert James Farnley
    Watford, England
[21] Appl. No. 788,603
[22] Filed Jan. 2, 1969
[45] Patented Oct. 26, 1971
[73] Assignee Cassio Photographic Paper Co. Ltd.
    Watford, Hertfordshire, England
[32] Priority Jan. 15, 1968
[33] Great Britain
[31] 2079/68

[54] PAPER BASE COATING CONTAINING CONDENSATION PRODUCT OF A POLYAMIDE AND EPICHLOROHYDRIN
9 Claims, No Drawings

[52] U.S. Cl.................................................. 96/85, 96/82
[51] Int. Cl........................................................ G03c 1/86
[50] Field of Search............................................ 96/85, 82

[56] References Cited
UNITED STATES PATENTS

| | | | |
|---|---|---|---|
| 3,320,066 | 5/1967 | Garth............................. | 96/85 |
| 3,181,950 | 5/1965 | Koerber et al................ | 96/82 |
| 3,181,949 | 5/1965 | Koerber et al................ | 96/82 |

FOREIGN PATENTS 865,727  4/1961  Great Britain................

Primary Examiner—Norman G. Torchin
Assistant Examiner—Edward C. Kimlin
Attorney—Darby & Darby ABSTRACT: The tendency for included optical brightening agent to wash out of photographic material consisting of paper base coated with a layer comprising baryta in a binder material, and with photographic emulsion, is reduced by including in the baryta layer a water-soluble condensation product of a polyamide and epichlorohydrin which will act to insolubilize the binder.

PAPER BASE COATING CONTAINING CONDENSATION PRODUCT OF A POLYAMIDE AND EPICHLOROHYDRIN

This invention relates to baryta-coated paper and in particular to photographic paper base.

Photographic paper base must be extremely white when viewed by reflected light. For this reason the paper base is usually coated with a baryta (or barium sulfate)-containing layer before it is coated with a photographic emulsion. In order to increase the whiteness of the base and hence the background whiteness of any resultant photographic print it is normal practice to include either in the baryta layer or in the photographic emulsion layer an optical brightening agent. However not all of the optical brightening agent is retained by the coated paper during normal processing and washing, thus resulting in a loss of brightness of the finished photographic print.

It is an object of the present invention to provide paper base which comprises a baryta layer and an optical brightening agent and which after wet processing retains a greater proportion of the optical brightening agent.

According to the present invention, therefore, there is provided paper base which has coated thereon a layer which comprises barium sulfate (baryta), a water-soluble condensation product of a polyamide and epichlorohydrin, a film-forming binder for the baryta which can be insolubilized by the said condensation product, and in said layer or in a layer adjacent thereto an optical brightening agent.

It is preferred that the optical brightening agent is present in the baryta-containing layer but it may be present in a layer coated on to this layer, for example it may be present in the light-sensitive layer of the material in photographic paper.

The preferred amount of water-soluble condensation product of wherein epichlorohydrin is from 1 to 10 percent by weight based on the weight of binder material used.

The preferred water-soluble condensation products of polyamide and epichlorohydrin are those described in British Pat. No. 865,727 the disclosure of which is incorporated herein by reference. The polyamide reacted with epichlorohydrin contains the recurring groups $-NH(C_nH_{2n}HN)_x-CO-R-CO-$ wherein $n$ and $x$ are each at least two and R is the divalent hydrocarbon radical of the dibasic carboxylic acid of three to ten carbon atoms. The polyamide is prepared by heating together at reaction temperature a $C_3$ to $C_{10}$ saturated dibasic carboxylic acid and a polyalkylene polyamine containing two to eight alkylene groups, and then reacting the polyamide with epichlorohydrin. The reaction of the polyamide with the epichlorohydrin is terminated so as to yield a water-soluble condensate. A quarternizing agent may be included in the reaction mixture, e.g. dimethyl sulfate. The mole ratio of polyalkylene polyamine to dibasic carboxylic acid is preferably from 0.8:1 to 1.4:1. The reaction to form the polyamide is preferably carried out at 160°–210° C. and the reaction of the polyamide with the epichlorohydrin at 45°–100° C. Preferably the quarternizing agent is used in a proportion sufficient to convert 25 to 75 percent of the tertiary amine groups in the condensation product to quarternizing groups. The quarternized product is a cationic resin and in this form is preferred for use in the process of the present invention. In the production of the polyamide the polyalkylene polyamine may be a polyethylene, polypropylene or polybutylene polyamine, e.g. diethylene triamine, triethylene tetramine, tetraethylene pentamine, dipropylene triamine and N-bis (aminopropyl) methylamine. The dibasic carboxylic acid may be, for example, maleic, succinic, adipic or azelaic acid. Suitable condensation products for use in the present invention are marketed by the Hercules Powder Company (of U.S.A.) under the trade names Kymene 709 the preparation of which is described in British Pat. No. 865,727 and 557 the preparation of which is described in British Pat. No. 865,727, by Farbenfabrieken Bayer (of Germany) under the trade name NADAVIN FP and by Ciba (A.R.L.) Ltd. under the resin identification codes EL50 and EL51.

The Kymene products of British Pat. No. 865,727 have been found to be of particular value for use in the present invention.

The preferred binding materials for use in the present invention are gelatin alone and/or a mixture of gelatin and carboxymethyl cellulose.

Most optical brightening agents used in increasing the whiteness of coated paper are of the diamino stilbene sulfonic acid type. These compounds are however readily water soluble and thus are not wholly retained in coated paper which is subjected to wet processing. This is particularly true of photographic paper which contains optical brightening agents because not only is the paper wet processed but it is also usually subjected to a long water washing, e.g. for periods up to 30 minutes or more.

As shown in the examples which follow, the material of the present invention is able to retain the effect of the optical brightening agent originally present to a greater extent than conventional material (as shown by the brightness tests) even after extended water washing has taken place.

EXAMPLE I

A sheet of photographic paper is coated with a layer of baryta coating mixture to give a coating weight of 40 grams per square meter after being dried. The composition of the coating mixture is as follows:

aqueous barium sulfate paste containing 25 percent w/w water    817 grams
aqueous gelatin solution 10 percent    640 cc.
aqueous chrome alum solution 10 percent    15 cc.
water-sufficient to make volume to    1,000 cc.

A second sheet B of the same quality photographic paper is coated similarly with a layer of baryta-coating mixture of the following composition:

aqueous barium sulfate paste containing 25 percent w/w water    817 grams.
aqueous gelatin solution 10 percent    500 cc.
aqueous sodium carboxy methyl cellulose solution    140 cc.
Kymene 709 (25 percent by weight solids)    30 cc.
water-sufficient to make volume to    1,000 cc.

A third sheet C of the same quality paper is coated similarly with a layer of baryta coating mixture of the following composition:

aqueous barium sulfate paste containing 25 percent w/w water    817 grams
aqueous gelatin solution 10 percent    640 cc.
Kymene 709 (25 percent by weight solids)    15cc.
water-sufficient to make volume to    1,000 cc.

After drying, the three sheets are coated again on the surface with a photographic silver chlorobromide emulsion which contains 13 grams silver per litre and 0.7 grams of an optical brightening agent per litre. The coating weight of silver applied to each sheet is 1.5 grams per square meter.

After subsequent drying, the three sheets are developed for 2 minutes in ID20 developer at 20° C. without exposure to light, fixed for 10 minutes and then washed in running water. Samples are removed from the sheets after different times of washing and then dried. It is found that the samples from sheets B and C have whiter surfaces than a sample from sheet A when viewed by normal north daylight after any given time of washing, and that the retention of brightness during washing is greater on sheets B and C than it is on Sheet A.

The differences in visual brightness are found to be due to the different degrees of fluorescence to ultraviolet light as shown by measurements using an EEL fluorescent light meter.

Fluorescence Measurements (EEL units)

| Sheet | Washed 30 minutes | Washed 2 hours | Washed 4 hours |
| --- | --- | --- | --- |
| A | 73 | 63 | 61 |
| B | 80 | 73.5 | 74 |
| C | 82 | 78 | 79 |

EXAMPLE II

A sheet A of photographic paper is coated with a layer of baryta-coating mixture of coating weight 40 grams per square meter after being dried. The coating mixture has the following composition:

aqueous barium sulfate paste containing
25 percent water    817 grams
aqueous gelatin solution 10 percent    640 cc.
aqueous chrome alum solution 10 percent    15 cc.
aqueous Blankophor BUP solution 10 (optical brightening agent)    20 cc.
water-sufficient to make volume to    1 liter A sheet B of the same quality paper is coated similarly with a layer of coating mixture having the following composition:

aqueous barium sulfate paste containing
25 percent water    817 grams
aqueous gelatin solution 10 percent    640 cc.
aqueous Blankophor BUP solution 10 percent (optical brightening agent)    20 cc.
water-sufficient to make volume to    985 cc.
Kymene 709 (25 percent by weight solids) - .15 cc. is added to the above baryta mixture.

After drying, both sheets of baryta coated paper are coated again with a photographic silver chlorobromide emulsion which contains 13 grams of silver per liter, but which does not contain an optical brightening agent. The coating weight of silver applied to each sheet is again 1.5 grams per square meter.

After subsequent drying, both sheets are developed for 2 minutes in ID20 developer without exposure to light, fixed for 10 minutes and then washed in running water. Samples are removed from the sheets after different times of washing and then dried.

It is found that the samples from sheet B appear much whiter than those from sheet A when viewed by normal north daylight, and that the retention of brightness during washing is greater on sheet B than on sheet A. The differences in visual brightness are found to be due to the different degrees of fluorescence to ultraviolet light, as shown by measurements using an EEL fluorescent light meter.

Fluorescence Measurements (EEL units)

| Sheet | Washed 20 minutes | Sensitized & Processed Washed 1 hour | Washed 4 hours |
|---|---|---|---|
| A | 11   88 | ν | 74 |
| B | 116 | 114 | 112 |

Blankophor BUP referred to above is an optical brightening agent sold by Bayer A. G. Leverkusen, Germany. It is a derivative of 4: 4' diamino stilbenet—2: 2' disulfonic acid, sodium salt.

I claim as my invention:

1. A light-sensitive photographic paper comprising a paper base support having deposited thereon barium sulfate, a water-soluble condensation product of a polyamide and epichlorohydrin, a film-forming binder for said barium sulfate which can be insolubilized by said water-soluble condensation product, an optical brightening agent and a silver halide photographic emulsion, said polyamide containing recurring groups of the formula $-NH(C_nH_{2n}HN)_x-CO-R-CO-$ where $n$ and $x$ are each at least two and R is a divalent hydrocarbon radical of a dibasic carboxylic acid of three to ten carbon atoms.

2. A light-sensitive photographic paper according to claim 1 wherein each of said barium sulfate, said water-soluble condensation product of said polyamide and epichlorohydrin, said film-forming binder and said optical brightening agent are in the same layer deposited on said paper base support.

3. A light-sensitive photographic paper according to claim 1, wherein said water soluble condensation product of said polyamide and epichlorohydrin is a quaternized cationic resin in which about 25 to about 75 percent of the tertiary amines have been quaternized.

4. A light-sensitive photographic paper according to claim 1, wherein said condensation product of said polyamide and epichlorohydrin is present in an amount of about 1 to about 10 percent by weight based on the weight of said binder material.

5. A light-sensitive photographic paper according to claim 1, wherein said binder material contains gelatin.

6. A light-sensitive photographic paper according to claim 1, wherein said binder is a mixture of gelatin and carboxymethyl cellulose.

7. A light-sensitive photographic material according to claim 1, wherein said silver halide photographic emulsion and said optical brightening agent are deposited on said paper base support in a layer separate from said barium sulfate.

8. A light-sensitive photographic paper comprising a paper base support having coated thereon (1) a layer containing barium sulfate, a water soluble condensation product of a polyamide and epichlorohydrin, the reaction of said polyamide and said epichlorohydrin being carried out between about 45° and 100° C., a film-forming binder for said barium sulfate which can be insolubilized by said water-soluble condensation product, said water-soluble condensation product being present in an amount of about one to about 10 percent by weight of said binder and said polyamide containing recurring groups of the formula $-NH(C_nH_{2n}HN)_x-CO-R-CO-$ where $n$ and $x$ are each at least two and R is a divalent hydrocarbon radical of a dibasic carboxylic acid containing three to ten carbon atoms and (2) a layer comprising a photographic silver-halide emulsion.

9. A light-sensitive photographic paper according to claim 8, wherein said water-soluble condensation product of said polyamide and epichlorohydrin is a quaternized resin in which about 25 to about 75 percent of the tertiary amines have been quaternized.